Patented July 6, 1926.

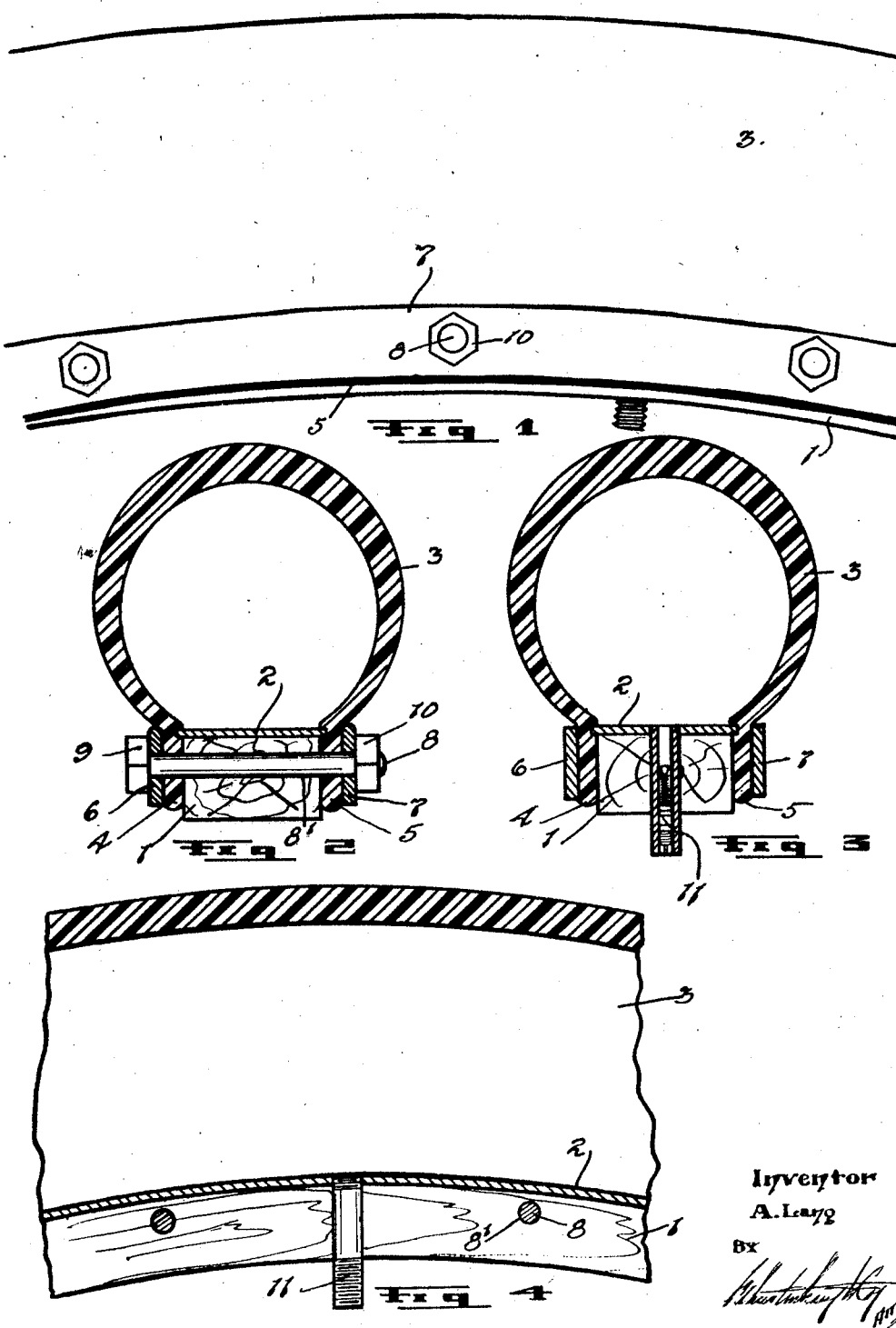

1,591,633

UNITED STATES PATENT OFFICE.

ANDREW LANG, OF EDMONTON, ALBERTA, CANADA.

AUTOMOBILE TIRE.

Application filed November 11, 1924. Serial No. 749,314.

The invention relates to improvements in automobile tires and the object of the invention is to provide a tire which can be inflated without requiring the customary inner tube, such being accomplished by providing a special means for attaching the tire to the wheel felloe, which means permits the tire to be inflated to the required pressure.

With the above important object in view, the invention consists essentially in the arrangement and construction of parts hereinafter more particularly described, reference being had to the accompanying drawing in which:

Fig. 1 is a side view of a portion of a tire embodying my invention.

Fig. 2 is a vertical, cross sectional view through the tire, the section being taken at one of the fastening bolts.

Fig. 3 is a view similar to Figure 2, the section being taken at the inflating valve.

Fig. 4 is a longitudinal vertical sectional view through a portion of the tire.

In the drawing like characters of reference indicate corresponding parts in the several figures.

The felloe 1 of the wheel is of the ordinary type and is carried by the spokes (not shown). On this felloe I mount a metallic band or rim 2, the rim being shrunk or otherwise effectively fastened to the felloe. It will be observed that the edges of the rim extend beyond the felloe.

The tire 3 is of the ordinary shape, with the exception that it has not the customary beads, but is provided with opposing side flanges 4 and 5 which are adapted to lie against the sides of the rim and felloe.

A pair of flat rings 6 and 7 are also provided, these having an exterior diameter approximately equal to the outer diameter of the rim and a width approximately equal to the width of the flanges.

The rings, flanges and felloe are provided with registering bolt holes 8′ through which fastening bolts 8 pass, the bolts being provided with enlarged heads 9 and fastening nuts 10.

The rim 2 carries an inflating valve 11 of any approved design which passes inwardly through the felloe in the usual manner.

The tire, having been placed on the felloe with the flanges thereof engaging the sides of the felloe and rim, is held in place by putting the rings against the outer faces of the flanges and then inserting the bolts and tightening up the nuts. When the nuts are properly tightened up, the rings hold the flanges tightly jammed against the felloe and effect an air tight joint and the edges of the rim embed themselves in the flanges. The tire is inflated with air in the usual manner through the valve 11.

This construction avoids the use of the customary inner tube and is practically punctureless and in this connection it is explained that the customary tire becomes flat owing to the inflated inner tube being punctured, say by a nail passing through the tire, the air leaking out, not through the tire, but between the tire and the rim. With a tire such as mine, should a nail puncture the tire there would be no escape of air and in fact should the nail be pulled out there is sufficient thickness of rubber to cause the opening to become sealed.

What I claim as my invention is:—

The combination with a wheel felloe, of a rim passing around the felloe and having the edges thereof projecting there beyond a predetermined distance, a tire having the edges thereof formed into flat lying flanges engaging the sides of the rim and felloe, opposing rings engaging the outer faces of the flanges, fastening bolts passing through the rings, flanges and felloe and adapted when tightened up to jam the flanges between the rings and felloe and cause the projecting edges of the rim to bite into the flanges and an inflating valve passing through the rim and the felloe.

Signed at Edmonton, Alberta, this 28th day of April, 1924.

ANDREW LANG.